(No Model.)

J. R. BARRY.
COMBINED WARBLER AND CAGE.

No. 266,415. Patented Oct. 24, 1882.

WITNESSES:
C. Neveux
C. Sedgwick

INVENTOR:
J. R. Barry
BY Munn & Co
ATTORNEYS.

UNITED STATES PATENT OFFICE.

JAMES R. BARRY, OF BROOKLYN, NEW YORK.

COMBINED WARBLER AND CAGE.

SPECIFICATION forming part of Letters Patent No. 266,415, dated October 24, 1882.

Application filed March 2, 1882. (No model.)

*To all whom it may concern:*

Be it known that I, JAMES R. BARRY, of Brooklyn, (Green Point P. O.,) Kings county, New York, have invented a new and useful Improvement in Combined Warbler and Cage, of which the following is a full, clear, and exact description.

Reference is to be had to the accompanying drawings, forming part of this specification, in which similar letters of reference indicate corresponding parts in both figures.

Figure 1:
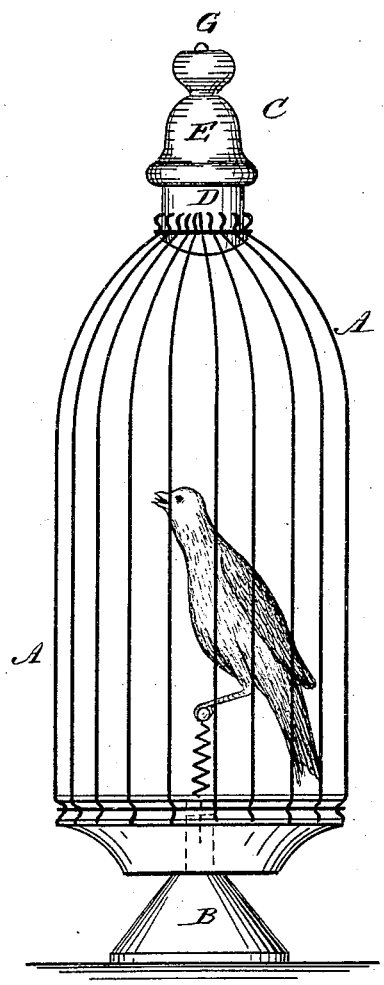
Figure 2:
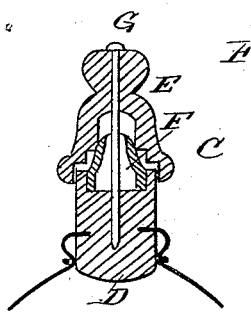

Figure 1 is a side elevation of my improvement, and Fig. 2 is a sectional side elevation of the upper part of the same.

The object of this invention is to connect with a cage an instrument for imitating the call or cry of a bird or animal confined in the cage, or for giving any other desired note or sound.

The invention consists in a cage having a warbler connected with it, as will be hereinafter shown and described.

A is a cage, which is provided with a foot, B, in the ordinary manner. To the top of the cage A is attached a warbler, C, which is formed of two pieces of wood, D E, and a piece of metal, F. The piece of metal is made in the form of a hollow cone, with an opening in its apex. The piece of wood E is concaved upon its lower end to form a shoulder or flange to fit upon the upper end of the piece of wood D, a shoulder in its inner part to fit upon the upper part of the metal cone F, and a concavity above the said metal cone F. The piece E is kept in place upon the piece D by a pin, G, passing through the said piece E and entering the piece D, as shown in Fig. 2. With this construction, when rosin is applied to the metal cone F and the piece of wood E is turned or revolved a noise will be made resembling the note or call of a bird.

The warbler C can be formed to imitate the note or call of the bird or animal confined in the cage, or some note or sound that it is desired to have the said bird or animal imitate or that will incite a bird to sing.

The warbler C is here shown and described as being applied to the top of a cage, but it can be applied to the bottom or side of the cage, or to the representation of a bird or animal placed within the cage.

Having thus described my invention, I claim as new and desire to secure by Letters Patent—

A bird-cage having a warbler, C, connected therewith, as and for the purpose specified.

JAMES R. BARRY.

Witnesses:
    JAMES T. GRAHAM,
    C. SEDGWICK.